No. 739,909. PATENTED SEPT. 29, 1903.
C. N. OGLE & I. K. HURT.
PULLEY.
APPLICATION FILED DEC. 10, 1902.
NO MODEL.
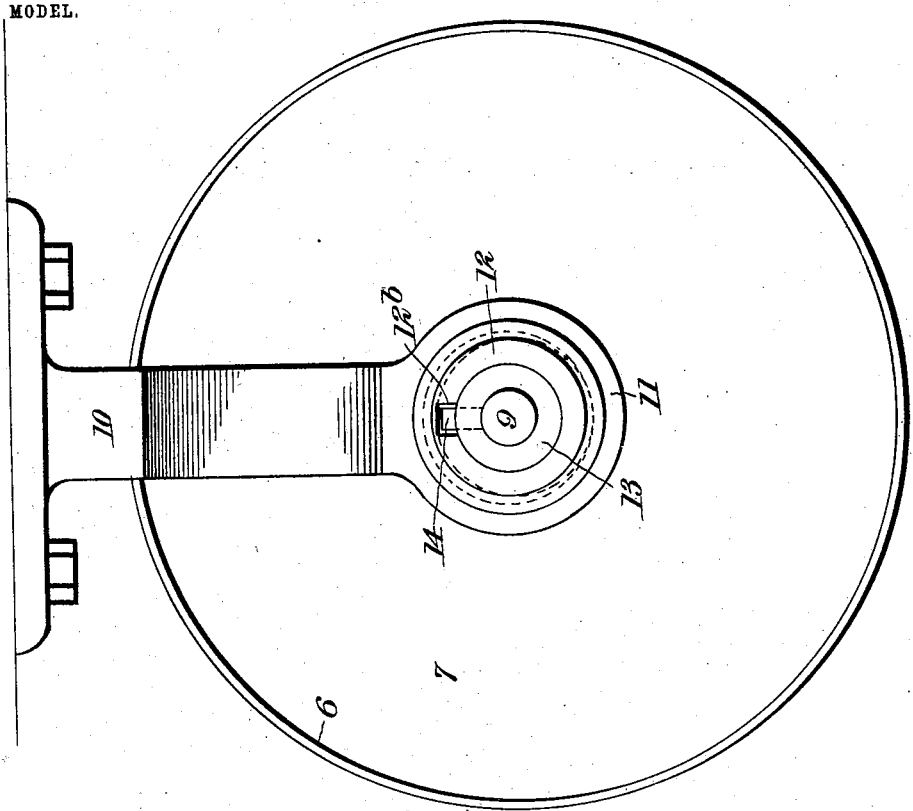
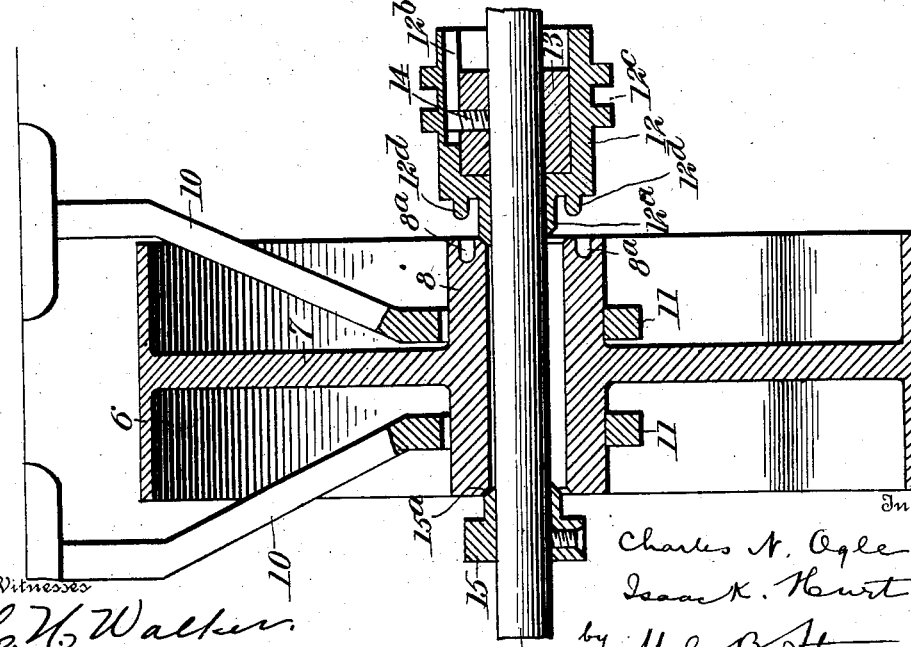

No. 739,909. Patented September 29, 1903.

UNITED STATES PATENT OFFICE.

CHARLES N. OGLE AND ISAAC K. HURT, OF CLEVELAND, OHIO.

PULLEY.

SPECIFICATION forming part of Letters Patent No. 739,909, dated September 29, 1903.

Application filed December 10, 1902. Serial No. 134,695. (No model.)

*To all whom it may concern:*

Be it known that we, CHARLES N. OGLE and ISAAC K. HURT, citizens of the United States, residing at Cleveland, in the county of Cuyahoga and State of Ohio, have invented certain new and useful Improvements in Pulleys; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention is particularly applicable to pulleys, but may be used with cog or other gear wheels of any kind used in transmitting motion from a shaft.

The object of the invention is to supply a fast or loose pulley or wheel with a hanger when idle, which will support it out of contact with the shaft, thus avoiding wear on the pulley and the shaft, a liability to accident, and wear on the belt.

A further object of our invention is to apply to such a pulley a clutch for lifting the pulley from contact with the hangers and coupling the same to the shaft.

Referring to the accompanying drawings, Figure 1 is a sectional view of the invention. Fig. 2 is a side elevation thereof.

Referring specifically to the drawings, the pulley-wheel shown comprises a rim 6, web 7, and hub 8. The shaft is indicated at 9. The eye of the hub is larger than the shaft. At 10 is indicated a pair of hangers, secured to the wall or other support and having eyes or rings 11, which surround the hub of the wheel. The hangers are properly bowed to avoid the rim of the pulley, and the eyes through which the hub extends are of such size that when the pulley is loose from the shaft it is supported by the hangers out of contact with said shaft, and consequently at rest.

The clutch shown in connection with the device includes a sliding block 12, which is sleeved over a collar 13, fixed to the shaft by a set-screw 14. The head of the block is conical, as at $12^a$, to enter the eye of the pulley, which is slightly countersunk to receive it. The head of the set-screw projects into a groove $12^b$ in the block, causing the rotation of the block with the shaft. At the opposite end of the hub is a collar 15, having a conical head $15^a$, similar to the head of the clutch-block 12. When said clutch-block is thrown into the pulley, which result may be conveniently effected by a lever working in the circular groove $12^c$, the action of the conical heads first lifts the pulley to a center with the shaft, when the pins $12^d$ on the clutch-block take hold in the holes $8^a$ of the hub, thereby driving the pulley. When the clutch-block is thrown out, the pulley drops and rests in the hanger.

What we claim as new, and desire to secure by Letters Patent, is—

1. The combination with a shaft, and a wheel thereon, and a clutch supporting the wheel on the shaft when fast, of hangers having an eye through which the hub of the wheel extends, adapted to support the same when loose.

2. The combination with a shaft and a wheel thereon, of a clutch supporting the wheel when fast, and hangers adapted to support the wheel when loose.

3. The combination with a wheel and supporting-hangers therefor in which the wheel is movable radially, of a shaft smaller than the eye of the wheel, and a clutch to couple the shaft and wheel, having conical heads which enter opposite ends of the eye of the wheel and adapted to lift the same from the hangers and center it with the shaft.

In testimony whereof we affix our signatures in presence of two witnesses.

CHARLES N. OGLE.
ISAAC K. HURT.

Witnesses:
JOHN A. BOMMHARDT,
LOTTIE NEWBURN.